United States Patent [19]

Warner et al.

[11] Patent Number: 5,341,345
[45] Date of Patent: Aug. 23, 1994

[54] ULTRASONIC STAND-OFF GAUGE

[75] Inventors: Kevin L. Warner; Joe M. Delasko, both of Houston, Tex.

[73] Assignee: Baker Hughes Incorporated, Houston, Tex.

[21] Appl. No.: 104,433

[22] Filed: Aug. 9, 1993

[51] Int. Cl.⁵ .......................... G01S 15/08; G01V 1/00
[52] U.S. Cl. ........................................ 367/99; 367/35; 367/902; 181/105
[58] Field of Search ...................... 367/99, 902, 35, 98, 367/34; 181/105

[56] References Cited

U.S. PATENT DOCUMENTS

| | | | |
|---|---|---|---|
| 4,570,486 | 2/1986 | Volkmann | 73/597 |
| 4,599,904 | 7/1986 | Fontenot | 73/151 |
| 4,665,511 | 5/1987 | Rodney et al. | 367/35 |
| 4,827,457 | 5/1989 | Seeman et al. | 367/27 |
| 4,867,264 | 9/1989 | Siegfried | 367/35 |
| 4,876,672 | 10/1989 | Petermann et al. | 367/35 |
| 4,964,085 | 10/1990 | Coope et al. | 367/35 |
| 4,975,889 | 12/1990 | Petrucelli et al. | 367/98 |
| 4,979,151 | 12/1990 | Ekstrom et al. | 367/35 |
| 5,027,331 | 6/1991 | Winbow et al. | 367/25 |
| 5,083,124 | 1/1992 | Nordstrom | 340/853.1 |
| 5,091,644 | 2/1992 | Minette | 250/254 |
| 5,120,963 | 6/1992 | Robinson et al. | 250/363.1 |
| 5,130,950 | 7/1992 | Orban et al. | 367/34 |

OTHER PUBLICATIONS

J. J. Orban, M. S. Dennison, B. M. Jorion, J. C. Mayes, New Ultrasonic Caliper for MWD Operations, Presented at SPE/IADC Drilling Conference, Mar. 1991, pp. 439–441.

Primary Examiner—Daniel T. Pihulic
Attorney, Agent, or Firm—Pravel, Hewitt, Kimball & Krieger

[57] ABSTRACT

An ultrasonic stand-off gauge for use in measuring the instantaneous stand-off distance between the drill stem and the borehole wall while drilling. A primary transducer mounted on the drill collar sends and receives ultrasonic pulses between the drill collar and the borehole wall. A second, reference transducer mounted on the pressure barrel within the drill collar measures the sound speed of the drilling fluid. The drilling fluid flows through a conduit within the drill collar, where the reference transducer transmits a pulse through the drilling fluid in the conduit. The pulse from the reference transducer is reflected off an internal reflector mounted on the internal surface of the drill collar. Since the distance between the reference transducer and the reflector is known and constant, the sound speed of the drilling fluid is determined accurately. Electronic circuitry uses the sound speed measurement of the drilling fluid as determined by the reference transducer to calculate accurate values of stand-off distance. The electronic circuitry also compensates for the variations of pressure, temperature and other characteristics of the drilling fluid, as well as for variances in the stand-off distance.

29 Claims, 5 Drawing Sheets

ULTRASONIC STAND-OFF GAUGE

BACKGROUND OF THE INVENTION

1. Field of the Invention

The present invention relates to an ultrasonic stand-off gauge for use in measuring the instantaneous stand-off between the drill stem and the borehole wall while drilling subterranean oil and gas wells.

2. Description of the Related Art

Apparatus for measuring the inner diameter of a borehole is known in the art, where a borehole is a well bore drilled in the ground. One such apparatus is a mechanical caliper, which measures the diameter of the borehole by extending a plurality of mechanical arms or members until the members contact the inner surface of the borehole. The mechanical caliper traverses the borehole to provide the desired information regarding borehole diameter with respect to depth. An example of a mechanical caliper is disclosed in U.S. Pat. No. 4,876,672 to Petermann, et al.

Mechanical borehole calipers have several well known disadvantages and deficiencies. One such disadvantage relates to the steel casing utilized in a borehole to support the upper levels of the borehole. Actuation of the caliper arms against the side of the steel casing will often result in scratching and other damage to the casing. Still another disadvantage of such mechanical calipers are their relatively complex construction and the fact that they are not part of the drilling apparatus. Because the caliper is a separate probe, the drilling operations must cease when measurements are taken. In addition, mechanical calipers require a large number of measurements in order to sufficiently define or map the borehole diameter.

Acoustic type caliper devices are also well known and overcome many of the problems and disadvantages of mechanical calipers. An example of an acoustic type caliper device is disclosed in U.S. Pat. No. 4,827,457 to Seeman et al. The Seeman apparatus comprises a plurality of piezoelectric type transducers mounted on a sonde. A sonde is a wireline device lowered into the borehole after drilling operations have ceased. Each transducer transmits a pulse through borehole fluid in the borehole towards the borehole wall. The borehole fluid may also be referenced to as drilling fluid or mud, which is the medium through which the acoustic waves travel. The acoustic pulses are then reflected by the borehole wall and return through the drilling fluid back to the sonde, where they are detected by the transducer from which they were generated, or by another transducer dedicated to the receiving of such pulses. The elapsed time between the transmission and reception of each pulse, otherwise referred to as the round-trip transit time (RTT), can be employed to provide a measurement of the distance from the transducer to the inner surface or wall of the borehole. The RTT divided by the speed of the pulse through the drilling fluid provides the distance traveled by the pulse. This distance is twice the distance from the transducer to the borehole wall.

In the Seeman '457 patent, the propagating velocity of the acoustic waves through the drilling fluid may be measured by use of a reference transducer. Nonetheless, the apparatus of Seeman employs nine transducers disposed in such a manner as to provide measurement over the entire inner circumference of the borehole. This is required because the sonde does not rotate. The processing of information from nine discrete transducers, as required by Seeman, necessitates complex multiplexer and demultiplexer circuitry. Further, the rate at which the sonde traverses the borehole determines the amount of information obtained. The slower the sonde traverses the well, the greater the amount of information obtained.

Other examples of wireline type acoustic calipers are described in U.S. Pat. Nos. 3,835,953 and 4,867,264 to Siegfried as well as U.S. Pat. No. 4,979,151 to Ekstrom, et al. All of these wireline acoustic caliper devices suffer from the distinct disadvantage of the necessity for pulling the drill stem from the borehole for utilization of the wireline tool. This operation is both time consuming and expensive from the standpoint of the drilling operation.

There have been attempts to take these measurements of the borehole during drilling operations. Devices to achieve this purpose are typically referred to as measurement-while-drilling (MWD) devices, which have the distinct advantage of allowing drilling operations to continue without interruption. Nevertheless, the sound speed of the drilling fluid must still be accurately determined.

The drilling fluid is preferably a special mixture of clay, water and chemical additives pumped downhole through a drill stem during drilling operations and upwardly through the annulus to return to surface drilling equipment. The drill stem typically includes a drill string connected to a series of drill collars, where the drill collars are connected to a drill bit at the end of the drill stem used to drill the borehole. The primary function of the drill collars is to provide a downward thrust or weight on the drill bit. The drilling fluid is pumped downwardly through a control bore extending through the string drill pipe and drill collars, and out of the drill bit. The drilling fluid cools the rapidly rotating bit, lubricates the drill stem as it turns in the well bore, carries rock cuttings to the surface and serves as a plaster to prevent the borehole wall of the borehole from crumbling or collapsing. The drilling fluid also provides the weight or hydrostatic head to prevent extraneous fluids from entering the borehole and to control downhole pressures that may be encountered.

An example of an MWD configuration is disclosed in U.S. Pat. No. 4,665,511 to Rodney, et al. This apparatus comprises at least one acoustic transceiver disposed within a section of a drill stem. The acoustic transceiver is adapted for generating an acoustic pulse and directing that pulse towards the borehole wall. The pulse is then reflected from the borehole wall and returns to the acoustic transceiver where the RTT is determined. A second acoustic receiver is disposed longitudinally with respect to the first transceiver at a selected distance for receiving a portion of the acoustic pulse generated by the transceiver. The difference in travel time between the pulse sensed by the second receiver and the pulse sensed by the transceiver is intended to be determinative of the acoustic velocity of the drilling fluid through which the pulses' have propagated, since the difference in distances of the travel paths of the respective pulses is considered known. The measured acoustic velocity of the drilling fluid is then combined with the RTT measured by the transceiver to compute stand-off. It should be noted that an erroneous measurement of the acoustic velocity of the drilling fluid will result in an erroneous stand-off determination.

The apparatus described in Rodney '511 can yield erroneous indications of the acoustic velocity of the drilling fluid because of the physical constraints present in the borehole and because of the directional nature of ultrasonic sensors. It is first noted that the directional path of the transmitted pulse as reflected off the borehole wall depends upon many factors, such as the strength of the signal and the condition of the borehole wall at the point of reflection. A longitudinally displaced receiver might not receive a reflected signal at all if the borehole wall is shaped so as to reflect the pulse in another direction, or if the tool is off-centered in the borehole and the pulse is not reflected in the direction of the receiver. More importantly, a longitudinally placed receiver is more likely to receive multiple reflections, where it is difficult to determine which path each reflection had traveled. Thus, the distance traveled by each reflected wave which is assumed in the teachings of Rodney to be known is, in fact, unknown in many conditions encountered in the actual MWD operation. An erroneous reflected wave path results in an erroneous acoustic velocity determination for the drilling fluid which, in turn, yields an erroneous stand-off measurement. Stated another way, the method of Rodney are subject to major error unless the borehole wall is very smooth, the MWD device is well centered within the borehole and acoustic impedances of the borehole environs are not conducive to multiple reflections. Such conditions in actual drilling practice is rather rare.

Furthermore, using devices according to Rodney, if the distance between the borehole wall and the transmitting device is relatively short compared to the distance between the transmitter and the longitudinally placed receiver, the wave will be "refracted" through the second medium of contrasting acoustic impedance. That is, refraction will occur at the interface of the drilling fluid and the borehole wall. In this manner, the wave essentially travels up the borehole wall before reaching the receiver, thus deviating from the simple ray path shown in Rodney. In any of these cases, erroneous or indeterminate results significantly reduce the effectiveness of the apparatus shown in Rodney. Since Rodney's device is only accurate in ideal conditions and does not provide accurate measurements of the acoustic velocity through the particular drilling fluid at a given time, it has been found that the Rodney device is ineffective for accurate stand-off measurements while drilling.

The acoustic stand-off measurement is complicated by several factors. One factor is the variation in the acoustic wave velocities (e.g. pressure wave velocity, shear wave velocity, etc. within the drilling fluid caused by differences in the density, pressure, temperature and composition of the drilling fluid. Other factors include the condition and shape of the borehole wall as well as the stand-off of the drill stem. These factors cause a relatively large dynamic range of received echo amplitudes. If the drilling fluid is water, which is rarely the case in most practical situations, the amplitudes of the reflected waves are relatively large and easy to measure. Heavy water-base muds cause greater attenuation of the propagating pulse, making echo detection more difficult. Oil-base muds of equal density to water-base muds cause a larger attenuation of the pulse, making echo detection even more difficult. The attenuation of these drilling fluids causes the echo to weaken as the path length, or stand-off, becomes larger. In addition, the amplitude of the echo can be smaller if the surface of the borehole wall is distorted or uneven.

There exists a need, therefore, for an accurate and reliable MWD stand-off measuring system for operation in a wide variety of conditions, which includes the capability of accurately measuring the velocity of acoustic waves within the drilling fluid at the same time the stand-off measurement is made. This acoustic velocity measurement is necessary in order to make an accurate stand-off measurement and must be independent of the condition of the borehole wall and impedance contrasts of the drilling fluid and the earth formation. An instantaneous stand-off measurement is desired because it may then be used to sort, in real-time, corresponding spectral data from formation evaluation tools, which is stand-off dependent. The data also provide further information on the effectiveness of the drilling program by indicating the movement of the drill stem in the borehole. To receive an accurate measurement of stand-off, an accurate determination of the acoustic velocity, or more specifically the velocity of pressure waves, within the drilling fluid is also required.

SUMMARY OF THE PRESENT INVENTION

An MWD stand-off gauge for measuring the instantaneous distance between a drill stem and the borehole wall while drilling using ultrasonic transducers is disclosed. A primary transducer is mounted on the drill collar of a drill stem and is used to probe the borehole wall by transmitting an ultrasonic pulse and then detecting its reflection from the borehole wall. A reference transducer, used to measure the velocity of pressure waves within the drilling fluid, is mounted on a pressure barrel facing a hollow area or conduit for drilling fluid flow within the drill stem. A stationary reflector is preferably mounted on the inside wall of the drill collar opposite the reference transducer. The ultrasonic pulse sent by the reference transducer and reflected by the reflector travels through the drilling fluid flowing downwardly within the internal conduit or bore of the drill stem. Since the distance between the reference transducer and the stationary reflector is known, the pressure wave velocity through the drilling fluid can be accurately determined. This measurement is combined with the measurement from the primary transducer to accurately determine the stand-off distance between the drill stem and the borehole wall.

The stand-off gauge includes a pulse-echo section for each transducer. Each section includes a pulser, an ultrasonic transducer, a receiver and detector. Each transducer can send and receive ultrasonic pulses. A voltage signal is applied across the transducer causing it to emit an ultrasonic pulse into the medium in which it is immersed, such as drilling fluid. The ultrasonic pulse travels through the medium, strikes a reflective surface and returns through the medium to the transducer. Electronic circuitry measures the round-trip transit time (RTT) of pressure waves induced by each transducer, and can calculate the stand-off distance based on the RTT from both the primary and reference transducers. The electronic circuitry also preferably includes a dynamic amplifier section which compensates for differences in the attenuation of drilling fluid and which provides a different amplification factor depending on the stand-off of the drill stem. In this way, the gain of the primary transducer amplifier is higher when the amplitude of the echo from the borehole wall is smaller, yielding a smaller dynamic range of signals presented to the detector. The gain is also increased, preferably exponentially, with increases in the stand-off distance.

In this manner, an accurate determination of the drilling fluid's pressure wave velocity can be made at any time, even under adverse conditions. This determination is used to accurately determine the stand-off of the drill stem. It should be noted that the drilling operation is such that drilling fluid exposed to the primary transducer contains earth formation cuttings from the drill bit while the drilling fluid exposed to the reference transducer does not contain cuttings. Normal drilling rates introduce no more than one percent cutting material by volume. It has been determined that cutting volumes of this magnitude have negligible effects on the velocity of pressure waves within the drilling fluid.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
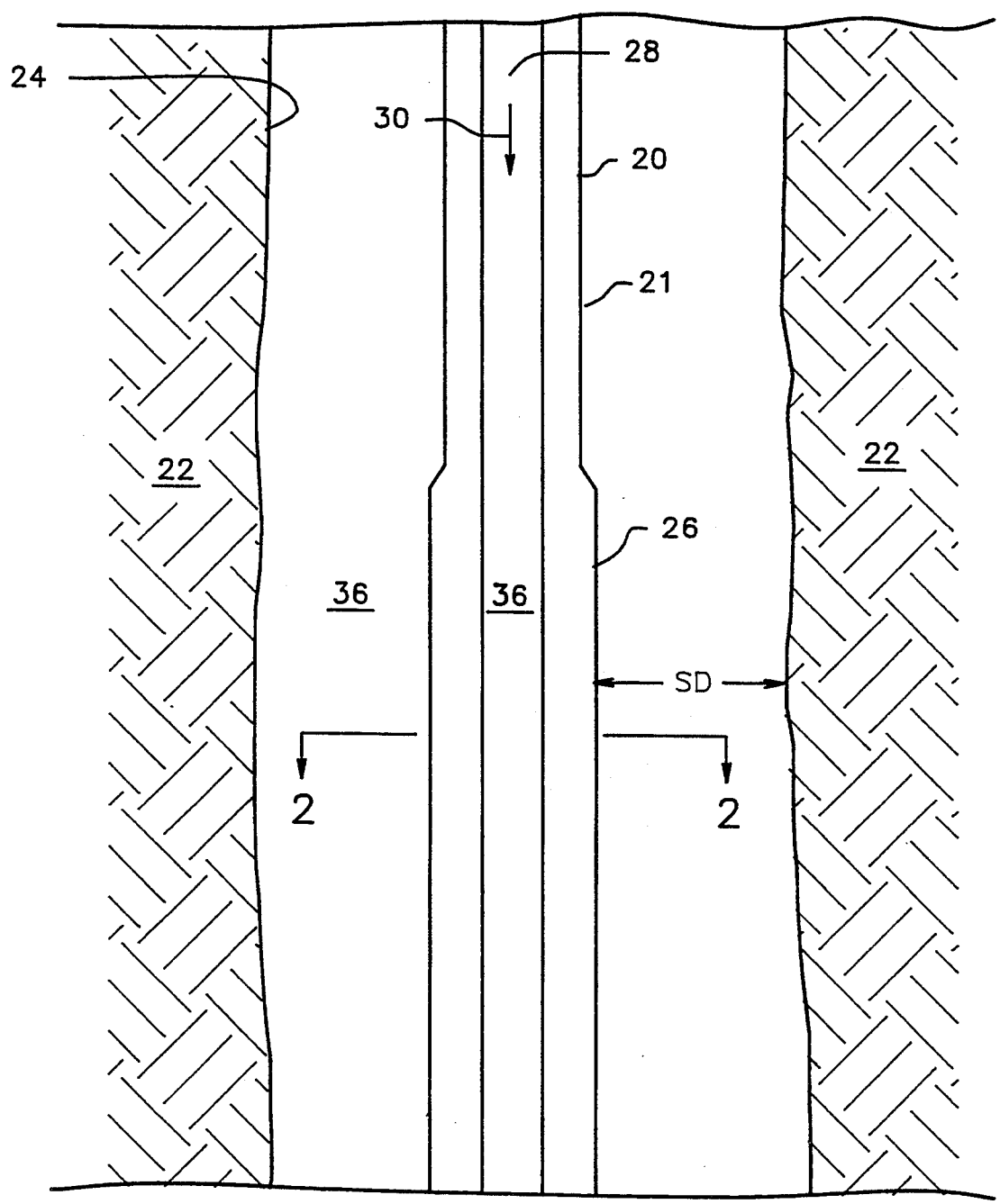
FIG. 1 is a cross-sectional elevation view in schematic showing a portion of a drill stem used to drill a borehole in the ground.

Referring now to FIG. 1, a cross-sectional elevation view is shown illustrating a drill stem 20 used to drill a borehole in the ground 22. The borehole includes a borehole wall 24, where it is desired to determine the stand-off distance, referred to by the letters SD, between the outer radius of drill stem 20 and the borehole wall 24. The drill stem 20 typically includes a drill string 21 comprised of a series of drill pipe connected to a series of drill collars 26, where the drill collars 26 are further connected to a drill bit (not shown) provided at the end of the drill stem 20. The drill string 21 and the drill collars of the drill stem 20 include a central hole, bore or conduit 28 used to pump drilling mud or drilling fluid 36 into the borehole. An arrow 30 indicates the direction of flow of drilling fluid 36 pumped through the conduit 28 of the drill stem 20. The drilling fluid 36 exits the drill bit and fills the annulus between the drill stem 20 and the borehole wall 24 as the fluid is pumped upwardly to the surface in a known manner. Thus, the drill stem 20 is essentially immersed in drilling fluid 36.

Figure 2:
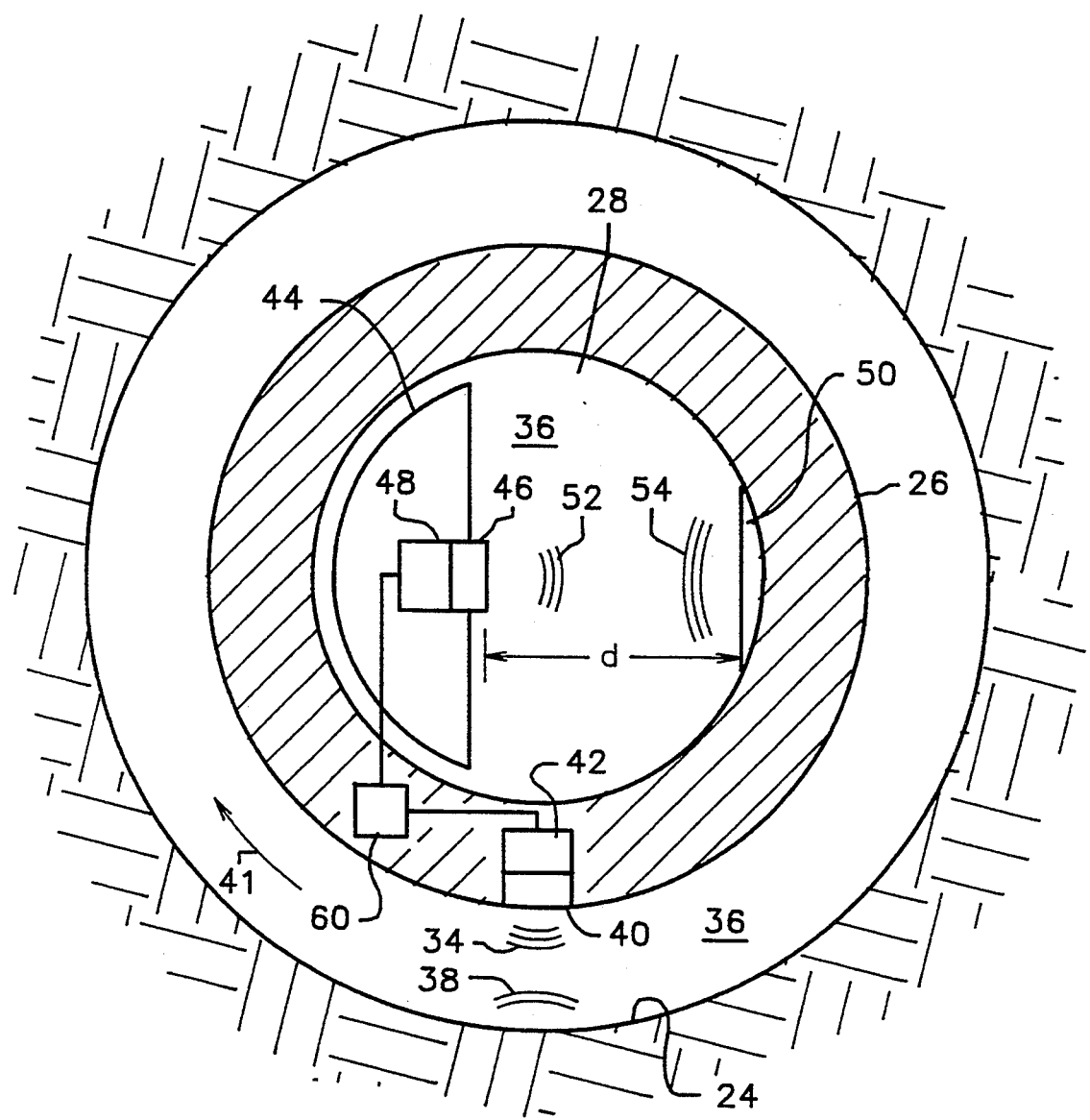
FIG. 2 is a cross-sectional elevation view looking along line 2—2 of FIG. 1, illustrating a stand-off gauge according to the present invention.

Referring now to FIG. 2, a cross-sectional elevation view, looking along line 2—2 of FIG. 1, shows one of the drill collars 26, referred to as the drill collar 26a, within the borehole. A primary transducer 40 is mounted on the drill collar 26a, which is used to generate an acoustic pulse or wave, otherwise referred to as pressure waves 34, into the borehole. The primary transducer 40 preferably comprises a piezoelectric crystal fashioned to convert acoustic signals to electrical signals and vice versa, although other types of acoustic transducers are contemplated. The pressure waves 34 propagate through the drilling fluid 36 towards the borehole wall 24. The pressure waves 34 are reflected off the borehole wall 24 as echo or reflected pressure waves 38, which again propagate through the drilling fluid 36 and back towards the primary transducer 40. The entire drill stem 20 is rotating as indicated by the arrow 41, so that the measurements are preferably made while drilling.

The velocity of the pressure waves 34 and 38 through the drilling fluid 36 depends upon many factors, including the weight, constituents, pressure and temperature of the drilling fluid 36. The drilling fluid 36 also affects the amplitude of the reflected pressure waves 38 detected by the primary transducer 40. If the drilling fluid 36 is pure water, the amplitudes of the reflected pressure waves 38 are relatively large and easy to measure. Heavy water-base muds and virtually all oil-base muds, however, cause greater attenuation of the reflected pressure waves 38, making detection more difficult.

Electronic circuitry, described below, is used to determine the round-trip transit time (RTT). RTT is defined as the sum of the time required for the pressure wave 34 to travel from the transducer 40 to the borehole wall 24 plus the time for the reflected pressure wave 38 to travel from the borehole wall 24 to the transducer 24. The RTT may be used to derive the stand-off distance SD between the drill collar 26a and the borehole wall 24, if the acoustic velocity of the drilling fluid is known. However, the determination of the stand-off distance SD based on the primary transducer 40 alone is inherently inaccurate due to variances of the drilling fluid 36 properties, which effect its sound speed. The drilling fluid 36 comprises varying proportions of a plurality of different substances, where the relative proportion of these substances directly effect the acoustic properties of the drilling fluid 36. The relative proportions are not necessarily known and tend to change over time. The composition of the drilling fluid 36, therefore, directly effects the RTT between the primary transducer 40 and the borehole wall 24. Thus, a precise determination of the stand-off distance SD can only be achieved if the velocity of pressure waves within the drilling fluid 36 is determined.

The primary transducer 40 is connected to a primary pulse-echo system 42, which employs the transducer 40 to both send and receive pressure waves. As described further below, the primary pulse-echo section 42 includes electronic circuitry to activate the primary transducer 40 to generate the pressure waves 34 towards the borehole wall 24, and to receive and detect the pressure waves 38 reflected from the borehole wall 24 back to the primary transducer 40.

A reference pulse-echo system 48 is mounted within a pressure barrel 44, where the reference pulse echo system 48 is connected to a reference transducer 46. The pressure barrel 44 is a sealed housing mounted to the internal surface of the drill collar 26a within the conduit 28, for containing and protecting all of the electronic circuitry. The reference transducer 46 and the reference pulse echo system 48 are preferably very similar to the primary transducer 40 and the primary pulse echo system 42, respectively. The reference pulse echo system 48 is preferably located near the primary pulse echo system 42, so that both systems are at approximately the same depth in the borehole while drilling, although this is not necessarily required to achieve accurate results.

The reference pulse echo system 48 includes electronic circuitry to activate the reference transducer 46 to transmit an acoustic pulse or pressure waves 52 within the conduit 28 through the drilling fluid 36 towards the internal surface of the drill collar 26a. The pressure waves 52 are then reflected from the internal surface of the drill collar 26a, or other intentionally placed reflecting surface, and propagate back to the reference transducer 46 as reflected pressure waves 54. In a similar manner as the pulse echo section 42, the electronic circuitry of the reference pulse echo system 48 detects the reflected pressure waves 54 reaching the reference transducer 46.

In the preferred embodiment, a reflector 50 is mounted opposite the reference transducer 46 to increase the amplitudes of the reflected pressure waves 54 back to the reference transducer 46. The distance, referred to by the letter d, between the reference transducer 46 and the reflector 50 is known. In this manner, the RTT of the pressure waves 52, 54 transmitted by the reference transducer 46 is divided into twice the distance d to determine the velocity of pressure waves within the drilling fluid 36 flowing through the conduit 28.

Once the acoustic velocity of the drilling fluid 36 is known, it can be used in conjunction with the measurement of RTT by the primary pulse-echo system 42 to determine the stand-off distance SD between the drill collar 26a and the borehole wall 24. The RTT of the reference transducer 46 is referred to as $RTT_R$, the RTT of the primary transducer 40 is referred to as $RTT_P$, the velocity of pressure waves within the drilling fluid 36 is referred to as v and the distance between the reference transducer 46 and the reflector 50 is d. The velocity is determined from the equation $v=(2d)/RTT_R$ and the stand-off distance is expressed as $SD=v(RRT_P/2)$. Substituting the first equation into the second equation yields the following equation:

$$SD = d(RTT_P/RTT_R)$$

where SD can be determined since $RTT_P$ and $RTT_R$ are measured and d is a known parameter of the device. A computer 60, mounted within the pressure barrel 44, is connected to both pulse echo systems 42 and 48 to retrieve the $RTT_R$ and $RTT_P$ values from both pulse echo systems 42 and 48, respectively. The computer 60 controls both pulse echo systems 42 and 48 by determining when to assert the pulse to create the pressure waves 34 and 52.

It will be appreciated that the duration of each of the acoustic pulses are sufficiently shorter than the time required for the pulses to propagate one round trip. This allows precise measurements of the times of arrival of reflected waves 38 and 54 without interference from subsequent pressure waves 34 and 52, respectively. This, in turn, yields precise values of $RTT_P$ and $RTT_R$ which results in a precise determination of SD using the above equation. The magnitude of the pulses 34 and 52 must also be sufficient to assure detection of the reflected pressure waves 38 and 54 by the respective reference transducers 40 and 46. The shape and detection of the reflected pressure waves 38 at the primary transducer 40 depend on several factors, including the shape or distortion of the borehole wall 24. In addition, it is important that the rotation of the drill stem 20 has not rotated the primary transducer 40 beyond the point at which the reflected pressure waves 38 are no longer detectable. This requires the $RTT_P$ to be sufficiently less than the time required to move the primary transducer 40 more than the diameter of the primary transducer 40. These two considerations influence the placement of the primary transducer 40 in the drill collar 26.

In a preferred method of operation, a plurality of pulses 34 are transmitted at small increments of rotation of the drill stem 20. The corresponding reflected pressure waves 38 are detected by the primary transducer 40 and the corresponding $RTT_P$ values are calculated by the computer 60 and are used to process nuclear data and are also preferably stored in memory. In this manner, sufficient data are provided to define the stand-off distance SD, when combined with $RTT_R$ between the borehole wall 24 and the drill stem 20 around the circumference of the borehole with sufficient accuracy. The number of data points may be varied within the limits of the ability of the primary transducer 40 to receive the reflected pressure waves 38. Thus, a plurality of $RTT_P$ values, as measured by the primary transducer 40, are collected and stored by the computer 60. Each of the $RTT_P$ values correspond to a stand-off distance SD between the drill stem 20 and the borehole wall 24 at a given time and point of rotation.

Figure 3:
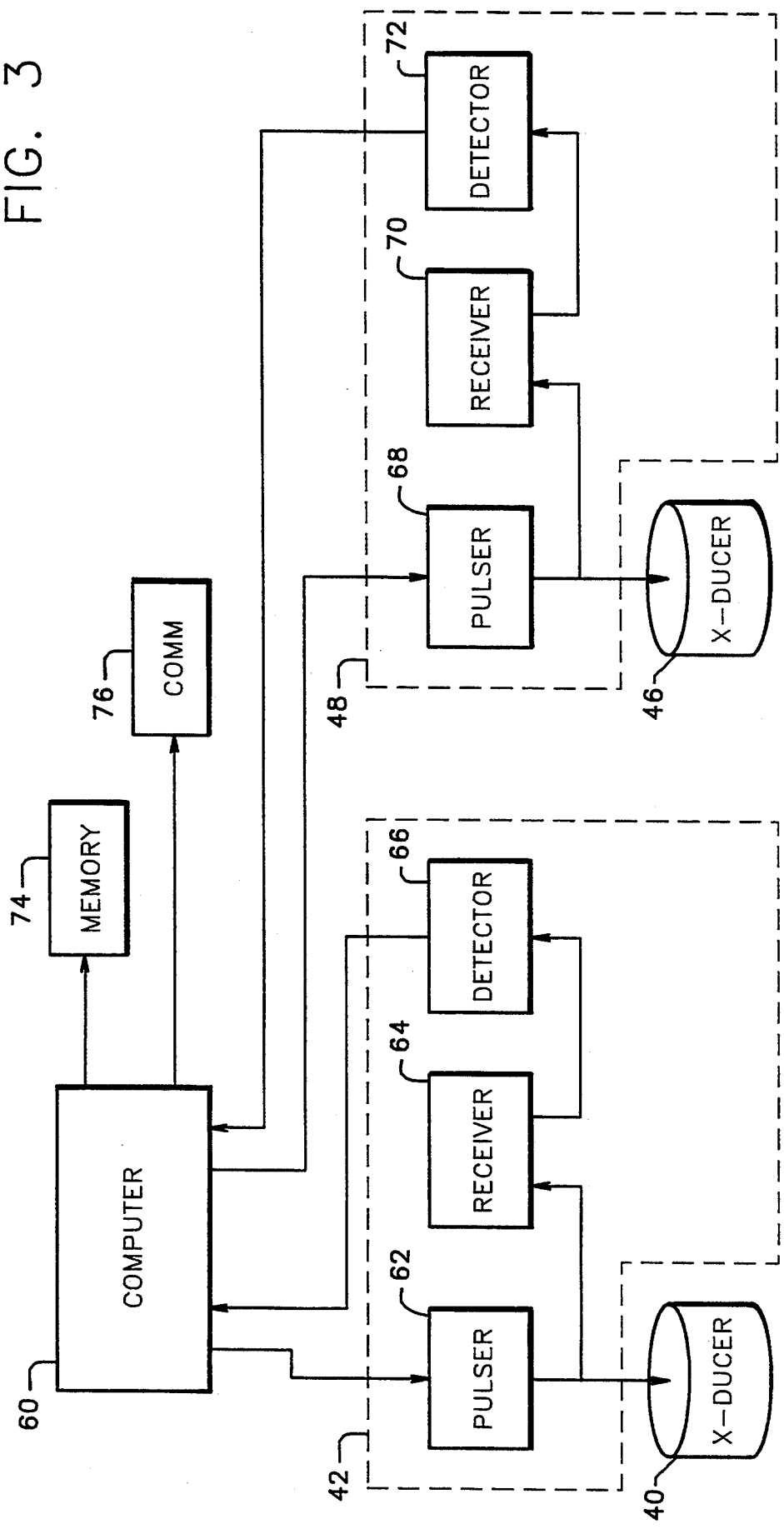
FIG. 3 is a simplified block diagram of the pulse echo sections coupled to the transducers and the computer shown in FIG. 2.

Referring now to FIG. 3, a simplified block diagram of the pulse echo sections 42 and 48 connected to the transducer 40, 46 and the computer 60 is shown. The pulse echo system 42 includes a pulser 62 connected to the primary transducer 40, where the primary transducer 40 is also connected to a receiver 64. A detector 66 is connected to the receiver 64 and to the computer 60. In operation, the computer 60 sends an activation signal to the pulser 62, which responsively applies a voltage signal to the primary transducer 40. The primary transducer 40 responds by generating the pressure waves 34. The computer 60 initiates an internal timer (not shown) approximately coincident with the activation signal sent to the pulser 62, indicating the approximate time that the primary transducer 40 initiates transmitting the pressure waves 34. The timer may be any type of digital timer as known to those skilled in the art, but generally is a binary counter. The primary transducer 40 receives the reflected pressure waves 38, and converts the waves into electrical signals detected by the receiver 64. The receiver 64 transmits an amplified signal to the detector 66. The detector 66 sends a corresponding signal back to the computer 60, which then stops or otherwise reads the timer and stores its value corresponding to an $RTT_P$ value.

The amplified signals from the receiver 64 are generally short, broadband bursts. The detector 66 preferably includes rectification and filtering circuitry to identify the approximate time the transducer 40 receives the reflected pressure waves 38. The detector 66 preferably transmits a digital signal to the computer 60. In operation, the computer 60 sends a plurality of signals to the pulser 62 and measures a corresponding plurality of $RTT_P$ values. The computer 60 also preferably includes a memory 74 coupled to the computer 60 for storing these plurality of $RTT_P$ values. The computer 60 may also transmit these values to the surface through a communication means 76, also connected to the computer 60.

In a like manner, the reference pulse echo section 48 includes a pulser 68 connected to the reference transducer 46, where the reference transducer 46 is connected to a receiver 70. The receiver 70 is connected to a detector 72, which is further connected to the computer 60. The reference transducer 46, the pulser 68, the receiver 64 and the detector 72 operate in a similar manner as the primary transducer 40 and the pulser 62, the receiver 64 and the detector 66, respectively. In this manner, the computer 60 may use the same or a second binary counter or timer to measure a plurality of $RTT_R$ values, which are stored in the memory 74 or sent to the surface through the communication means 76. It is understood that the computer 60 may also include means for calculating, using $RTT_R$ as previously described, the stand-off distance SD corresponding to each $RTT_P$ value, and store the stand-off distances in the memory 74, or transmit these values using the communication means 76.

Figure 4:
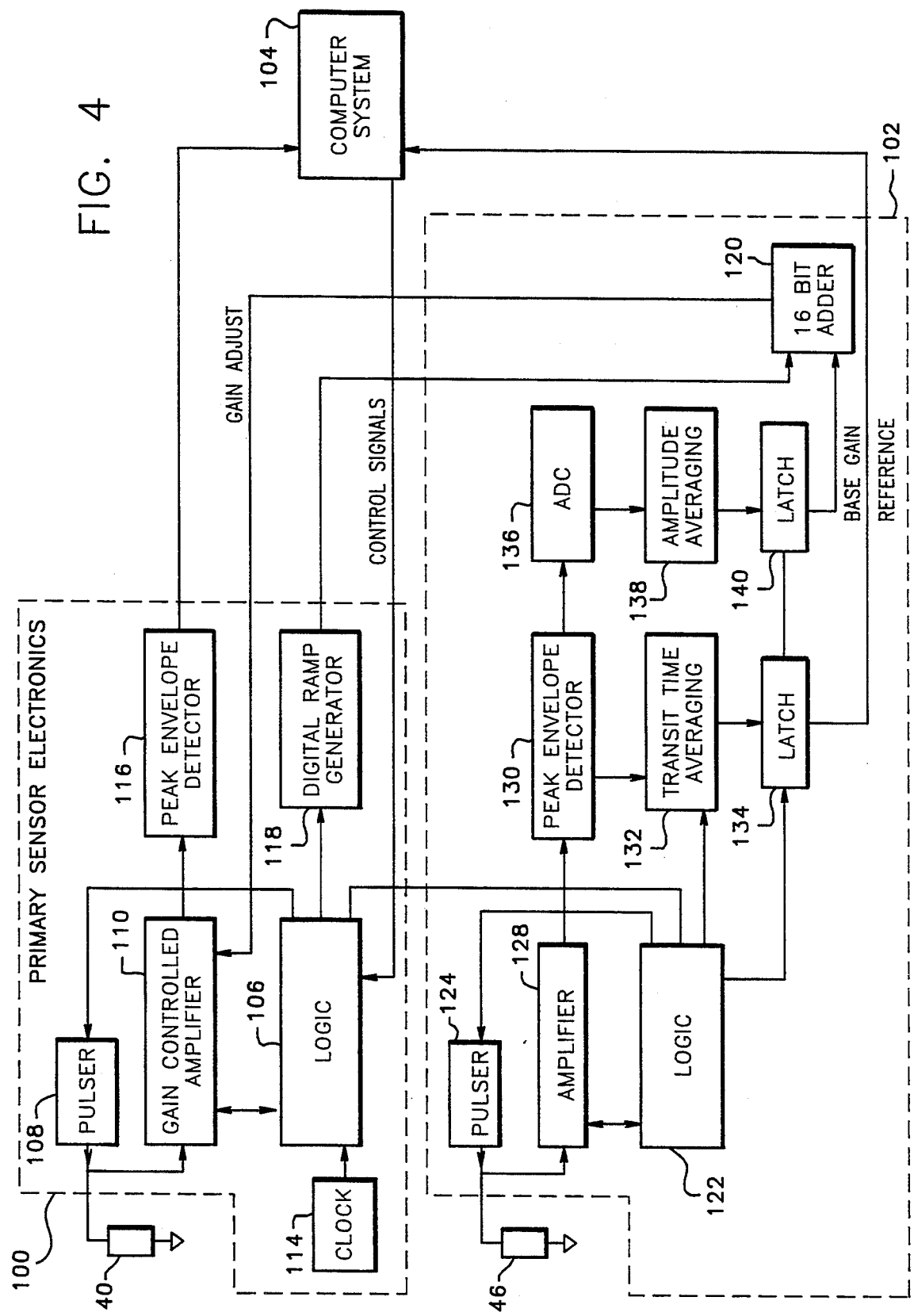
FIG. 4 is a simplified block diagram of an alternative embodiment of a stand-off gauge according to the present invention.

Referring now to FIG. 4, a simplified block diagram is shown of an alternative embodiment according to the present invention. A primary pulse echo section 100 and a reference pulse echo section 102 are both connected to and controlled by a computer system 104. The computer system 104 preferably includes processing capabilities as well as memory and digital communication circuitry as desired, although these separate functions are not shown for purposes of simplicity. The computer system 104 provides a series of control signals to a logic block 106. Clock circuitry 114 is connected to the logic block 106 for purposes of synchronization and timing. The logic block 106 provides an output to a pulser 108. The primary transducer 40 is connected to the pulser 108 and ground, where ground would typically be the body of the drill collar 26a.

The primary transducer 40 provides an output to a gain controlled amplifier 110, which is connected to the logic block 106 and which provides an output to a peak envelope detector (PED) 116. In general, the logic block 106 asserts an activation signal to the pulser 108, which respondingly provides a voltage signal to the primary transducer 40. The logic block 106 turns off the gain controlled amplifier 110 for a period of time while the pulser 108 is asserting a voltage signal to the primary transducer 40 to eliminate effects of ringing, and to prevent mistaking the transmitted from the received pressure waves. The logic block 106 then activates the gain controlled amplifier 110 so that the reflected pressure waves 38 received by the primary transducer 40 are amplified by the gain controlled amplifier 110 and provided to the PED 116.

The PED 116 preferably includes rectifier and filtering electronic circuitry to generate an envelope signal of the amplified signal from the gain controlled amplifier 110. Furthermore, the PED 116 provides a signal to the computer system 104 when the envelope signal has reached its peak value. The computer system 104 measures a corresponding $RTT_P$ value upon receipt of the signal indicating the peak value of the envelope signal from the PED 116.

The gain controlled amplifier 110 also receives a signal referred to as GAIN ADJUST from an adder circuit 120. The pressure waves are attenuated by two factors. Attenuation is first ompacted by the characteristics of the drilling fluid. Secondly, attenuation is impacted by the distance (i.e. the stand-off ×2) the acoustic pulse must travel from the transducer to the borehole wall and back to the transducer. Gain must be adjusted based upon these two factors. The adder 120 receives and adds together two inputs, one from a digital ramp generator 118 within the primary pulse echo section 100 which adjusts gain for stand-off and another from a latch 140, described below, which adjusts gain for drilling fluid attenuation properties. In the preferred embodiment, the inputs from the digital ramp generator 118 and the latch 140 are 16-bit digital values, where the adder 120 is a 16-bit adder. Other sizes are contemplated depending upon the resolution of gain desired. Although not shown, the adder 120 preferably includes a digital to analog (D/A) converter to convert the digital sum of the inputs to the proportional analog GAIN ADJUST signal. The logic block 106 resets and initiates the digital ramp generator 118 simultaneously with a pulse initiated by the pulser 108 to the primary transducer 40. The digital ramp 118 and the adder 120 adjust the GAIN ADJUST signal to continually increase the gain of the gain controlled amplifier 110 until the primary transducer 40 receives the reflected pressure waves 38. In this manner, the larger the stand-off distance SD and the greater the attenuation properties of the drilling fluid, the greater the gain of the gain controlled amplifier 100.

Turning first to SD attenuation, it is known that the amplitude of the reflected pressure waves 38, when arriving at the primary transducer 40, is directly effected by the stand-off distance SD between the primary transducer 40 and the borehole wall 24. In addition, for a given SD, this signal loss is associated with the attenuation of the drilling fluid 36. In general, the greater the stand-off distance SD, the smaller the amplitude of the reflected pressures waves 38 at the primary transducer 40, and therefore the greater the value needed for the gain controlled amplifier 110. When the logic block 106 indicates to the pulser 108 to transmit a pulse through the primary transducer 40, the digital ramp generator 118 is initiated so that its output begins to increase. The longer the time before the reflected pressure waves 38 reach the primary transducer 40, the greater the magnitude of the GAIN ADJUST signal from the adder 120. Thus, more gain is applied by the gain controlled amplifier 110 as needed to directly compensate for attenuation within the stand-off distance SD, thereby providing a wider dynamic range of detectable signals.

It is also known that the decay in signal strength versus $RTT_P$ is exponential, so that the magnitude of the digital ramp generator 118 is preferably increased in an exponential fashion. In the preferred embodiment, exponentially increasing values are held in an electrically erasable programmable read only memory (EEPROM), which values are used to apply as instantaneous gain factors. The exponentially increasing digital values are received and added by the adder 120 to increase the magnitude of the GAIN ADJUST signal. This adjusts gain for SD attenuation only. Gain adjustment for drilling fluid will be discussed below.

The logic block 106 is also connected to a similar logic block 122 used to control the elements in the reference pulse echo section 102. The logic block 122 is connected to a pulser 124 and to an amplifier 128 in a similar manner as described above for the primary pulse echo section 100. The pulser 124 is connected to the reference transducer 46, which is also connected to ground. The reference transducer 46 provides an input to the amplifier 128, where the amplifier 128 provides an output to a PED 130 in a similar manner as described previously. Thus, the logic block 122 asserts a signal to the pulser 124, which provides a voltage signal to the reference transducer 46 to generate the pressure waves 52. The logic block 122 also deactivates the amplifier 128 while the pulser 124 is activating the reference transducer 46.

The PED 130 operates in a similar manner as the PED 116, where the PED 130 also includes rectifier and filter electronic circuitry to generate an envelope signal, and asserts a signal at a first output when the envelope signal has reached its peak value. The PED 130 also includes a hold mode where it provides a second output having a voltage level equivalent to the peak value of the envelope signal. The PED 130 provides its first output to a transit time averaging circuit 132, which is also connected to the logic block 122. In this manner, the $RTT_R$ values are averaged over time to minimize the effects of rapid variations in $RTT_R$ values. The average $RTT_R$ transit time values are held in a latch 134, which is also controlled by the logic block 122. The output of the average $RTT_R$ values are provided to the computer system 104 to be used in determining the velocity of pressure waves within the drilling fluid 36 for use in calculations of stand-off distances SD.

The PED 130 also provides its second output to an analog to digital converter (ADC) 136, which converts the peak voltage signal from the PED 130 to a digital value. The digital value is provided to an amplitude averaging circuit 138, which averages the digital values from the ADC 136 over several iterations of the measurements of $RTT_R$. In this manner, the digital representations of the amplitudes of the reflected pressure waves 54 can be averaged over a period of time, which will minimize the effects of rapid variations of amplitude. The average amplitude values are provided to and held in the latch 140, which is updated after the next averaging sequence is completed. The latch 140 is also preferably connected to and controlled by the logic block 122. The values in the latch 140 are preferably digital values of the amplitude average, where the output of the latch 140 provides a baseline gain signal, otherwise referred to as the BASE GAIN signal, which is provided to the adder 120 as described previously.

The BASE GAIN signal is used to compensate for the temperature, pressure and other signal attenuating characteristics of the drilling fluid 36. In this manner, the amplitudes of the reflected pressure waves 54 measured by the reference pulse echo section 102 are averaged and then used to adjust the gain of the gain controlled amplifier 110 in the primary pulse echo section 100 for the second attenuating factor, namely the attenuating properties of the drilling fluid. This provides a more precise $RTT_P$ measurement over a wider range of conditions within the borehole, with gain now being adjusted for SD attenuation and drilling fluid attenuation. The value in the latch 140 is preferably in two's complement digital form, so that smaller amplitudes received by the reference transducer 46, produce a higher BASE GAIN signal, while larger amplitudes produce a lower BASE GAIN signal.

Figure 5:
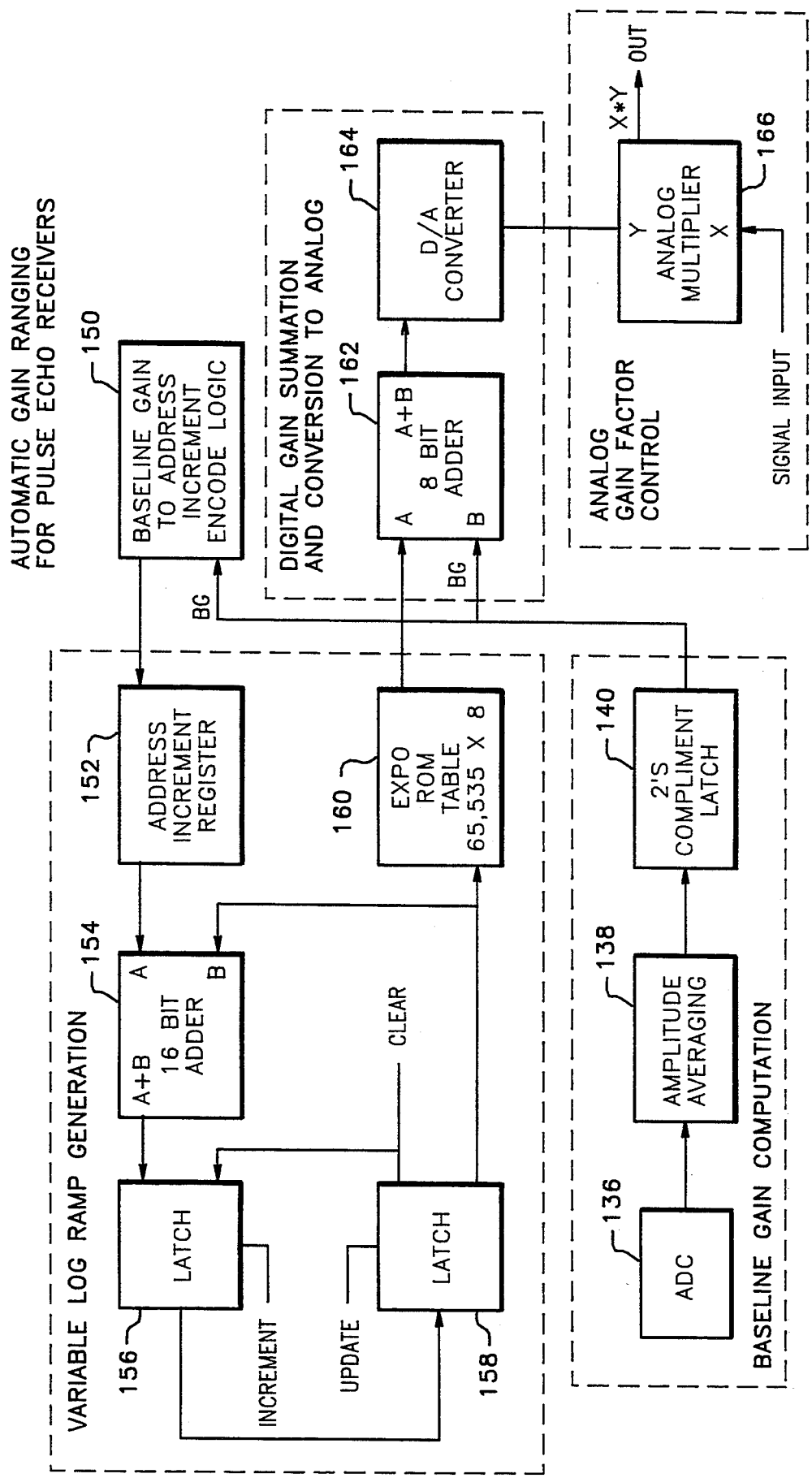
FIG. 5 is a more detailed block diagram of a circuit used for compensating the gain controlled amplifier of FIG. 4.

Referring now to FIG. 5, a more detailed block diagram of a circuit for compensating the gain controlled amplifier 110 of FIG. 4 is shown. As before, a baseline gain computation is performed while the ADC 136 provides an output to the amplitude averaging circuit 138, which provides an output to the latch 140. Recalling that the base gain is determined by the amplitude of the pressure waves 54 in the drilling fluid column which, in turn, is a function of the attenuation properties of the drilling fluid. In this embodiment, the BASE GAIN signal from the latch 140 is provided to a baseline gain encoder 150, which provides an output to an address increment register (AIR) 152. Essentially, the baseline gain encoder 150 converts the BASE GAIN signal to the appropriate digital value held by and output from the AIR 152. The address increment register 152 controls the sequence of values output from an exponential read only memory (ROM) table 160, further described below. The ROM table 160 is preferably an EEPROM as described previously for the digital ramp generator 118. The output of the AIR 152 is preferably an 8-bit digital value ranging from 1 to 255, which is provided to the A input of a 16-bit adder 154. The upper 8 input bits of the A input are preferably grounded or otherwise set equal to zero. The B input of the adder 154 is connected to the output of a 16-bit latch 158. The adder 154 adds the digital values from its A and B inputs and provides the sum through an output to a latch 156, which has an input receiving a signal INCREMENT and a clear input receiving a signal CLEAR. The output of the latch 156 is connected to the input of the latch 158, which has a clear input also receiving the CLEAR signal as well as an input receiving a signal UPDATE. The INCREMENT and UPDATE signals operate essentially the same, where the input value of the latch is latched to its output when the INCREMENT or UPDATE signals are pulsed.

The output of the latch 158 is connected to the input of the ROM table 160. The ROM table 160 preferably holds 65,536 bytes, where each byte represents a gain value. The gain value ramping system will output 256 sequential gain values, where the gain value addressed by the input from the latch 158 is provided on an 8-bit output. The output of the ROM table 160 is connected to the A input of an 8-bit adder 162. The output of the latch 140 is provided to the B input of the adder 162, which adds the digital values at its A and B input and provides the digital sum to a D/A converter 164. The output of the D/A converter 164 is connected to the Y-input of an analog multiplier 166. The analog multiplier 166 has an X-input connected to the primary transducer 40. The multiplier 166 multiplies the analog signals from its X and Y inputs and provides the multiplied signal at its output. Thus, the analog multiplier 166 multiplies the output of the D/A converter 164 by the signal from the primary transducer 40, and provides the multiplied analog signal at its output. The multiplied signal is provided to the PED 116.

In operation, the baseline gain computation from the latch 140 determines an offset base gain based upon the amplitudes of the reflected pressure waves 54 received by the reference transducer 46. This adjusts the gain of the system for attenuation properties of the drilling fluid. This offset is applied to the adder 162. The baseline gain is also used to determine a value in the AIR 152, which determines the value of the exponent or the rate of gain increase at the output of the ROM table 160.

When a pulse is initiated by the primary transducer 40 generating the pressure waves 34, the CLEAR signal is pulsed to clear the latches 156 and 158. Thus, the BASE GAIN signal and the output of the ROM table 160 establish an initial gain of the multiplier 166, which is the initial gain of the gain controlled amplifier 110. Then, the INCREMENT and UPDATE signals are pulsed at a predetermined rate by the logic 106 during the RTT time of the pressure waves 34, 38, so that the ROM table 160 outputs sequential gain values. When the reflected pressure waves 38 are received by the primary transducer 40 and detected by the PED 116, the INCREMENT and UPDATE signals are no longer pulsed, so that the ROM table 160 outputs a maximum gain factor for that iteration. This adjusts the measured signal for attenuation as a function of SD since the gain is increased until the reflected signal 38 is detected at the primary transducer 40. The INCREMENT and UPDATE signals are pulsed a maximum of 256 times. Once the maximum gain factor is reached, the gain is held constant until the next iteration.

The value in the AIR 152 not only affects the initial gain but also determines the width of each step through the address of the ROM table 160 between 1 and 255. For example, if the AIR 152 holds a value of 1, then each step is 1, so that the first 255 values stored in the ROM table 160 are provided to the adder 162. If, however, the AIR 152 holds a value of 128, then every 128th value stored in the ROM table 160 is provided at its output for each pulse of the INCREMENT and UPDATE signals. In this case, every 128th gain factor value in the ROM table 160 is output of the ROM table 160 for a total of 255 sequential gain values, where the maximum gain factor is at address 32,768 and has a gain value of 16. Thus, the gain increases exponentially from 1 to a maximum of 16. In a like manner, if the AIR held a value of 192, then every 192nd gain value of the ROM table 160 would be output resulting in an exponential increase to a maximum gain of 64. The maximum output of the ROM table 160 is a gain of 255.

In this manner, the increasing gain factors will increase the maximum gain value that is obtained. Each time the primary transducer 40 is pulsed, the latches 156 and 158 are cleared and a new baseline gain factor is latched by the latch 140, thus defining a new value in the AIR 152. Thus, the output of the multiplier 166, which defines the gain of the gain controlled amplifier 110, is essentially determined by the baseline gain computation from the reference pulse echo section 102 coupled with an exponential gain factor based upon the stand-off distance SD.

It can now be appreciated that the gain controlled amplifier 110 is compensated by the temperature, pressure and other attenuating characteristics of the drilling fluid 36, as well as for attenuation as a function of stand-off distance SD.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention. Various modifications of the techniques, procedures, material and equipment will be apparent to those in the art. It is intended that all such variations within the scope and spirit of the appended claims be embraced thereby.

We claim:

1. A stand-off gauge for measuring the distance between a drill stem and a borehole wall during drilling of a borehole, wherein the drill stem has an internal conduit used to pump drilling fluid into the borehole, said stand-off gauge comprising:
   a primary transducer unit disposed on the drill stem for transmitting pressure waves towards the borehole wall, for receiving and detecting pressure waves reflected by the borehole wall and for providing a primary signal indicative thereof;
   a reference transducer unit disposed within the drill stem conduit for transmitting pressure waves towards an inner surface of the drill stem conduit through the drilling fluid for receiving and detecting pressure waves reflected from said inner surface of the drill stem conduit and for providing a reference signal indicative thereof, wherein said reference transducer unit is located a predetermined distance from said inner surface of the drill stem conduit; and a calculation unit coupled to said primary and reference transducer means and for receiving said primary and reference signals and for calculating a corresponding stand-off distance between the exterior wall of the drill stem and the borehole wall by combining said primary and secondary reference signals using a predetermined relationship.

2. The stand-off gauge of claim 1,
   wherein said primary transducer unit receives a primary activation signal for transmitting pressure waves towards the borehole wall;
   wherein said reference transducer unit receives a reference activation signal for transmitting pressure waves within the drill stem; and
   wherein said calculation unit comprises:
      means coupled to said primary and reference transducer units for asserting said primary and reference activation signals,
      primary measuring means coupled to said asserting means and receiving said signal indicative of receiving and detecting the reflected pressure waves from said primary transducer means, for measuring the round trip transit time between said primary transducer means and the borehole wall,
      reference measuring means coupled to said asserting means and receiving said signal indicative of receiving and detecting the reflected pressure waves from said reference transducer means, for measuring the round trip transit time between said reference transducer means and said inner surface of the drill stem, and
      means coupled to said primary and reference measuring means for calculating a corresponding stand-off distance.

3. The stand-off gauge of claim 1, further comprising:
   a reflector mounted to the inner surface of the drill stem opposite said reference transducer unit, wherein said predetermined distance is measured from said reference transducer unit to said reflector and wherein the surface of said reflector and the transmitting surface of said transducer unit are parallel.
   means coupled to said primary and reference transducer units for asserting said primary and reference activation signals,
   primary measuring means coupled to said asserting means and receiving said signal indicative of receiving and detecting the reflected pressure waves from said primary transducer means, for measuring the round trip transit time between said primary transducer means and the borehole wall,
   reference measuring means coupled to said asserting means and receiving said signal indicative of receiving and detecting the reflected pressure waves from said reference transducer means, for measuring the round trip transit time between said reference transducer means and said inner surface of the drill stem, and means coupled to said primary and reference measuring means for calculating a corresponding stand-off distance.

4. The stand-off gauge of claim 1, wherein said primary and reference transducer units each include:

an acoustic transducer for converting electrical signals into acoustic pressure waves and for converting acoustic pressure waves into electrical signals.

5. The stand-off gauge of claim 4, wherein said acoustic transducer includes a piezoelectric crystal.

6. The stand-off gauge of claim 4, wherein said primary and reference transducer units each include:

a pulser coupled to said acoustic transducer for applying an electrical signal to activate said acoustic transducer to transmit pressure waves;

an amplifier coupled to said acoustic transducer for amplifying electrical signals produced by said acoustic transducer; and a detector coupled to said amplifier for detecting said amplified electrical signals and for asserting a signal indicative thereof.

7. The stand-off gauge of claim 1, wherein said calculation unit includes a timer for measuring the round trip transit times.

8. The stand-off gauge of claim 7, wherein said timer comprises a binary counter.

9. The stand-off gauge of claim 1, wherein said calculation unit further comprises:

a computer; and memory coupled to said computer.

10. A stand-off gauge for measuring the distance between a drill stem and a borehole wall during drilling of a borehole, wherein the drill stem has an internal conduit used to pump drilling fluid into the borehole, and said stand-off gauge comprises:

a primary transducer unit disposed on the drill stem for transmitting pressure waves towards the borehole wall, for receiving and detecting pressure waves reflected by the borehole wall and for providing a primary signal indicative thereof;

a reference transducer unit disposed within the drill stem conduit for transmitting pressure waves towards an inner surface of the drill stem conduit through the drilling fluid for receiving and detecting pressure waves reflected from said inner surface of the drill stem conduit and for providing a reference signal indicative thereof, wherein said reference transducer unit is located a predetermined distance from said inner surface of the drill stem conduit; and a calculation unit coupled to said primary and reference transducer means and receiving said primary and reference signals for calculating a corresponding stand-off distance between the exterior wall of the drill stem and the borehole wall wherein said stand-off gauge measures a plurality of stand-off distances as the drill stem rotates while drilling the borehole, and wherein said calculation unit further comprises a round trip transit time averaging circuit for measuring and averaging a plurality of round trip transit times over a period of time.

11. The stand-off gauge of claim 10, wherein said stand-off gauge measures a plurality of stand-off distances as the drill stem rotates while drilling the borehole, the stand-off gauge further comprising:

an amplitude averaging circuit receiving a plurality of peak signals and for averaging said plurality of peak values over time to derive a baseline gain signal; and wherein said reference transducer unit comprises:

a reference acoustic transducer for converting electrical signals into acoustic pressure waves in response to a reference activation signal and for converting acoustic pressure waves into electrical signals, an amplifier coupled to said reference acoustic transducer for amplifying electrical signals produced by said acoustic transducer, and a peak envelope detector coupled to said amplifier and said amplitude averaging circuit for converting the amplified signals to an envelope signal and providing said plurality of peak signals, each having a voltage level indicative of the maximum value of said envelope signal;

wherein said primary transducer unit comprises:

a primary acoustic transducer for converting electrical signals into acoustic pressure waves in response to a primary activation signal and for converting acoustic pressure waves into electrical signals, and a gain controlled amplifier coupled to said primary acoustic transducer and said amplitude averaging circuit for amplifying electrical signals produced by said primary acoustic transducer, wherein the gain of said gain controlled amplifier is determined by said baseline gain signal; and wherein said calculation unit further comprises control logic circuitry coupled to said primary and reference transducer units for asserting said primary and reference activation signals, respectively.

12. The stand-off gauge of claim 11, further comprising:

an analog to digital converter receiving said peak signal for converting said peak signal to a corresponding digital peak signal;

wherein said amplitude averaging circuit is coupled to said analog to digital converter for averaging a plurality of digital peak signals over time and proving said baseline gain signal in two's complement format; and a digital to analog converter receiving said baseline gain signal and converting it to analog.

13. The stand-off gauge of claim 11, further comprising:

a ramp generator coupled to said calculation unit having an output signal ranging between a minimum value and a maximum value, wherein said output signal begins at said minimum value when said primary activation signal is asserted and wherein said output signal continually increases until said primary acoustic transducer produces electrical signals when receiving pressure waves reflected by the borehole wall or said maximum ramp signal value is reached; and an adder circuit coupled to said gain controlled amplifier and receiving said output signal of said ramp generator and said baseline gain signal, for adding said output signal and said baseline gain signal and providing a summation signal to said gain controlled amplifier, wherein the gain of said gain controlled amplifier is determined by said summation signal.

14. The stand-off gauge of claim 13, wherein said ramp generator includes an electrically erasable programmable read only memory having stored gain values increasing exponentially from said minimum value to said maximum value.

15. The stand-off gauge of claim 1, further comprising:
   wherein said primary transducer unit comprises:
      an acoustic transducer for converting electrical signals into acoustic pressure waves and for converting acoustic pressure waves into electrical signals, and
      a gain controlled amplifier coupled to said acoustic transducer for amplifying electrical signals produced by said acoustic transducer, wherein the gain of said gain controlled amplifier is increased as a constant function of time under the control of a ramp signal; and
   a ramp generator coupled to said calculation unit and said primary transducer unit for providing said ramp signal at its output wherein said ramp signal ranges between a minimum value and a maximum value and wherein said ramp signal begins at said minimum value when said primary acoustic transducer transmits pressure waves towards the borehole wall and wherein said ramp signal continually increases until said primary acoustic transducer produces electrical signals when receiving pressure waves reflected by the borehole wall.

16. The stand-off gauge of claim 15, wherein said ramp generator includes an electrically erasable programmable read only memory having stored gain values increasing exponentially from said minimum value to said maximum value.

17. The stand-off gauge of claim 10, further comprising:
   wherein said primary transducer unit comprises:
      a primary acoustic transducer for converting electrical signals into acoustic pressure waves and for converting acoustic pressure waves into electrical signals, and
      an analog multiplier coupled to said primary acoustic transducer and receiving a gain signal, wherein said analog multiplier multiplies the electrical signals from said primary acoustic transducer by said gain signal;
   wherein said reference transducer unit comprises a detection circuit for determining a baseline gain signal inversely proportional to the amplitude of pressure waves reflected from said inner surface of the drill stem and received by said reference transducer unit;
   an encoder coupled to said detection circuit for converting said baseline gain signal to a corresponding address step value;
   an adder and latch circuit receiving said address step value and an increment signal, for providing an incrementally increasing address having an initial minimum address value which is increased by the amount of said address step value upon respective pulses of said increment signal;
   a memory unit having an address input receiving said incrementally increasing address and an output, said memory having stored gain values ranging from a minimum gain value to a maximum gain value, wherein said memory provides a gain value corresponding to an address provided at its address input;
   an adder circuit coupled to said memory and said detection circuit, said address circuit adding said baseline gain signal to said gain values provided from said memory for providing said gain signal to said analog multiplier; and
   said calculation unit comprising logic circuitry coupled to said primary transducer unit for activating said primary acoustic transducer to transmit pressure waves towards the borehole wall, and for pulsing said increment signal at a predetermined rate until said primary acoustic transducer produces signals upon receiving reflected pressure waves from the borehole wall.

18. The stand-off gauge of claim 17, wherein said gain values stored in said memory increase exponentially from said minimum gain value to said maximum gain value.

19. The stand-off gauge of claim 17, wherein said adder and latch circuit includes a double latch circuit, wherein said double latch circuit comprises:
   a first latch receiving said address step value and said increment signal and providing an output signal; and
   a second latch receiving said output signal of said first latch and an update signal and providing said incrementally increasing address, wherein said incrementally increasing address is increased by the amount of said address step value upon respective pulses of said update and increment signals.

20. The stand-off gauge of claim 10, wherein said stand-off gauge measures a plurality of stand-off distances as the drill stem rotates while drilling the borehole, further comprising:
   wherein said primary transducer unit comprises:
      a primary acoustic transducer for converting electrical signals into acoustic pressure waves and for converting acoustic pressure waves into electrical signals, and
      an analog multiplier coupled to said primary acoustic transducer and receiving a gain signal, wherein said analog multiplier multiplies the electrical signals from said primary acoustic transducer by said gain signal;
   wherein said reference transducer unit comprises:
      a reference acoustic transducer for converting electrical signals into acoustic pressure waves and for converting acoustic pressure waves into electrical signals,
      an amplifier coupled to said reference acoustic transducer for amplifying electrical signals produced by said acoustic transducer, and
      a peak envelope detector coupled to said amplifier for converting the amplified electrical signals to a peak signal having a voltage level indicative of the maximum value of said amplified electrical signals;
   an amplitude averaging circuit coupled to said reference transducer unit for averaging a plurality of peak signals over time to derive a baseline gain signal;
   an encoder and register coupled to said amplitude averaging circuit for converting said baseline gain signal to a corresponding address step value;
   a first adder circuit coupled to said encoder and register for adding said address step value to an incrementally increasing address and providing a summation signal;

a first latch receiving said summation signal and an increment signal, wherein said first latch provides the value of said summation signal at its output upon respective pulses of said increment signal;

a second latch coupled to said first latch and receiving said summation signal and an update signal for providing said incrementally increasing address, wherein said incrementally increasing address has an initial minimum address value which is increased by said address step value upon respective pulses of said update signal;

a memory unit coupled to said second latch having an address input receiving said incrementally increasing address, said memory having stored exponentially increasing gain values ranging from a minimum gain value to a maximum gain value and providing a gain value corresponding to said incrementally increasing address provided to said address input; and a second adder circuit for adding said gain value from said memory to said baseline gain signal for providing said gain signal to said analog multiplier; and wherein said calculation unit toggles said increment and update signals until said primary acoustic transducer produces signals upon receiving reflected pressure waves from said borehole wall.

21. The stand-off gauge of claim 1, wherein said stand-off gauge measures a plurality of stand-off distances as the drill stem rotates while drilling the borehole, and wherein said calculation unit further comprises:

a round trip transit time averaging circuit for measuring and averaging a plurality of round trip transit times over a period of time.

22. The stand-off gauge of claim 1, wherein said stand-off gauge measures a plurality of stand-off distances as the drill stem rotates while drilling the borehole, the stand-off gauge further comprising:

an amplitude averaging circuit receiving a plurality of peak signals and for averaging said plurality of peak values over time to derive a baseline gain signal; and wherein said reference transducer unit comprises:

a reference acoustic transducer for converting electrical signals into acoustic pressure waves in response to a reference activation signal and for converting acoustic pressure waves into electrical signals, an amplifier coupled to said reference acoustic transducer for amplifying electrical signals produced by said acoustic transducer, and a peak envelope detector coupled to said amplifier and said amplitude averaging circuit for converting the amplified signals to an envelope signal and providing said plurality of peak signals, each having a voltage level indicative of the maximum value of said envelope signal;

wherein said primary transducer unit comprises:

a primary acoustic transducer for converting electrical signals into acoustic pressure waves in response to a primary activation signal and for converting acoustic pressure waves into electrical signals, and a gain controlled amplifier coupled to said primary acoustic transducer and said amplitude averaging circuit for amplifying electrical signals produced by said primary acoustic transducer, wherein the gain of said gain controlled amplifier is determined by said baseline gain signal; and wherein said calculation unit further comprises control logic circuitry coupled to said primary and reference transducer units for asserting said primary and reference activation signals, respectively.

23. The stand-off gauge of claim 22, further comprising:

an analog to digital converter receiving said peak signal for converting said peak signal to a corresponding digital peak signal;

wherein said amplitude averaging circuit is coupled to said analog to digital converter for averaging a plurality of digital peak signals over time and providing said baseline gain signal in two's complement format; and a digital to analog converter receiving said baseline gain signal and converting it to analog.

24. The stand-off gauge of claim 22, further comprising:

a ramp generator coupled to said calculation unit having an output signal ranging between a minimum value and a maximum value, wherein said output signal begins at said minimum value when said primary activation signal is asserted and wherein said output signal continually increases until said primary acoustic transducer produces electrical signals when receiving pressure waves reflected by the borehole wall; and an adder circuit coupled to said gain controlled amplifier and receiving said output signal of said ramp generator and said baseline gain signal, for adding said output signal and said baseline gain signal and providing a summation signal to said gain controlled amplifier, wherein the gain of said gain controlled amplifier is determined by said summation signal.

25. The stand-off gauge of claim 24, wherein said ramp generator includes an electrically erasable programmable read only memory having stored gain values increasing exponentially from said minimum value to said maximum value.

26. The stand-off gauge of claim 1, further comprising:

wherein said primary transducer unit comprises:

a primary acoustic transducer for converting electrical signals into acoustic pressure waves and for converting acoustic pressure waves into electrical signals, and an analog multiplier coupled to said primary acoustic transducer and receiving a gain signal, wherein said analog multiplier multiplies the electrical signals from said primary acoustic transducer by said gain signal;

wherein said reference transducer unit comprises a detection circuit for determining a baseline gain signal inversely proportional to the amplitude of pressure waves reflected from said inner surface of the drill stem and received by said reference transducer unit;

an encoder coupled to said detection circuit for converting said baseline gain signal to a corresponding address step value;

an adder and latch circuit receiving said address step value and an increment signal, for providing an incrementally increasing address having an initial minimum address value which is increased by the amount of said address step value upon respective pulses of said increment signal;

a memory unit having an address input receiving said incrementally increasing address and an output, said memory having stored gain values ranging from a minimum gain value to a maximum gain value, wherein said memory provides a gain value corresponding to an address provided at its address input;

an adder circuit coupled to said memory and said detection circuit, said address circuit adding said baseline gain signal to said gain values provided from said memory for providing said gain signal to said analog multiplier; and said calculation unit comprising logic circuitry coupled to said primary transducer unit for activating said primary acoustic transducer to transmit pressure waves towards the borehole wall, and for pulsing said increment signal at a predetermined rate until said primary acoustic transducer produces signals upon receiving reflected pressure waves from the borehole wall.

27. The stand-off gauge of claim 26 wherein said gain values stored in said memory increase exponentially from said minimum gain value to said maximum gain value.

28. The stand-off gauge of claim 26, wherein said adder and latch circuit includes a double latch circuit, wherein said double latch circuit comprises:

a first latch receiving said address step value and said increment signal and providing an output signal; and a second latch receiving said output signal of said first latch and an update signal and providing said incrementally increasing address, wherein said incrementally increasing address is increased by the amount of said address step value upon respective pulses of said update and increment signals.

29. The stand-off gauge of claim 1, wherein said stand-off gauge measures a plurality of stand-off distances as the drill stem rotates while drilling the borehole, further comprising:

wherein said primary transducer unit comprises:

a primary acoustic transducer for converting electrical signals into acoustic pressure waves and for converting acoustic pressure waves into electrical signals, and an analog multiplier coupled to said primary acoustic transducer and receiving a gain signal, wherein said analog multiplier multiplies the electrical signals from said primary acoustic transducer by said gain signal;

wherein said reference transducer unit comprises:

a reference acoustic transducer for converting electrical signals into acoustic pressure waves and for converting acoustic pressure waves into electrical signals, an amplifier coupled to said reference acoustic transducer for amplifying electrical signals produced by said acoustic transducer, and a peak envelope detector coupled to said amplifier for converting the amplified electrical signals to a peak signal having a voltage level indicative of the maximum value of said amplified electrical signals;

an amplitude averaging circuit coupled to said reference transducer unit for averaging a plurality of peak signals over time to derive a baseline gain signal;

an encoder and register coupled to said amplitude averaging circuit for converting said baseline gain signal to a corresponding address step value;

a first adder circuit coupled to said encoder and register for adding said address step value to an incrementally increasing address and providing a summation signal;

a first latch receiving said summation signal and an increment signal, wherein said first latch provides the value of said summation signal at its output upon respective pulses of said increment signal;

a second latch coupled to said first latch and receiving said summation signal and an update signal for providing said incrementally increasing address, wherein said incrementally increasing address has an initial minimum address value which is increased by said address step value upon respective pulses of said update signal;

a memory unit coupled to said second latch having an address input receiving said incrementally increasing address, said memory having stored exponentially increasing gain values ranging from a minimum gain value to a maximum gain value and providing a gain value corresponding to said incrementally increasing address provided to said address input; and a second adder circuit for adding said gain value from said memory to said baseline gain signal for providing said gain signal to said analog multiplier; and wherein said calculation unit toggles said increment and update signals until said primary acoustic transducer produces signals upon receiving reflected pressure waves from said borehole wall.

* * * * *